US008973276B2

(12) United States Patent
Van Bijsterveldt et al.

(10) Patent No.: US 8,973,276 B2
(45) Date of Patent: Mar. 10, 2015

(54) HANDGUARD FOR CHAINSAW

(75) Inventors: Hugo Van Bijsterveldt, Didam (NL); Stofan Stark, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 775 days.

(21) Appl. No.: 13/054,463

(22) PCT Filed: Jul. 14, 2008

(86) PCT No.: PCT/SE2008/050871
§ 371 (c)(1),
(2), (4) Date: Mar. 9, 2011

(87) PCT Pub. No.: WO2010/008328
PCT Pub. Date: Jan. 21, 2010

(65) Prior Publication Data

US 2011/0265334 A1 Nov. 3, 2011

(51) Int. Cl.

| | |
|---|---|
| ***B27B 17/02*** | (2006.01) |
| ***A01G 3/053*** | (2006.01) |
| ***B23D 57/02*** | (2006.01) |
| ***B27G 19/00*** | (2006.01) |

(52) U.S. Cl.
CPC .................................... *B27G 19/003* (2013.01)
USPC ................................................ 30/382; 30/381

(58) Field of Classification Search
USPC ........... 30/284, 285, 286, 295, 370, 382, 381; D8/65
See application file for complete search history.

(56) References Cited

U.S. PATENT DOCUMENTS

| | | | | | |
|---|---|---|---|---|---|
| 3,182,695 | A | * | 5/1965 | Rigoni | 30/382 |
| 3,380,493 | A | | 4/1968 | Giroux | |
| 3,991,469 | A | | 11/1976 | Frederickson | |
| 4,059,895 | A | * | 11/1977 | Hirschkoff | 30/382 |
| 4,156,477 | A | | 5/1979 | Inaga | |
| 4,197,640 | A | | 4/1980 | Murray | |
| 4,290,202 | A | * | 9/1981 | Nadenoff | 30/382 |
| 4,335,514 | A | | 6/1982 | Overy et al. | |
| 4,365,416 | A | * | 12/1982 | Overbury | 30/382 |
| 4,553,326 | A | | 11/1985 | West | |
| 4,693,006 | A | * | 9/1987 | Wehle | 30/383 |

(Continued)

FOREIGN PATENT DOCUMENTS

| | | |
|---|---|---|
| CA | 1266601 A | 3/1990 |
| CN | 1402660 A | 3/2003 |

(Continued)

OTHER PUBLICATIONS

International Preliminary Report on Patentability, International Application No. PCT/SE2008/050871, Oct. 15, 2010, pp. 1-6.

(Continued)

*Primary Examiner* — Hwei C Payer
(74) *Attorney, Agent, or Firm* — Novak Druce Connolly Bove + Quigg LLP

(57) ABSTRACT

The invention relates to a chainsaw having a front hand guard (20) including a protective structure (21), projecting in front of the front handle (5), pivotally attached to the engine housing (2) by at least one lever (25, 26) for activating a brake to brake the movement of the saw chain when being pivoted. The protective structure (21) includes see through means (24) enabling at least partial visibility through the protective structure (21), and twig preventing means for limiting the risk of objects such as twigs to get stuck in the protective structure (21).

20 Claims, 6 Drawing Sheets

(56) References Cited

U.S. PATENT DOCUMENTS

| | | | | | |
|---|---|---|---|---|---|
| 5,016,355 | A * | 5/1991 | Gassen et al. | 30/383 |
| 5,101,567 | A * | 4/1992 | Cool | 30/382 |
| 5,184,403 | A * | 2/1993 | Schliemann | 30/123.4 |
| 5,272,813 | A * | 12/1993 | Wolf et al. | 30/298.4 |
| D365,262 | S * | 12/1995 | Beaulieu et al. | D8/65 |
| 5,570,512 | A * | 11/1996 | Hoppner | 30/383 |
| D389,026 | S * | 1/1998 | Amano et al. | D8/65 |
| 5,901,457 | A * | 5/1999 | Harding | 33/630 |
| 5,984,054 | A * | 11/1999 | Martinsson | 188/77 R |
| 6,016,604 | A * | 1/2000 | Wolf et al. | 30/383 |
| D445,657 | S * | 7/2001 | Jong | D8/65 |
| 6,263,979 | B1 * | 7/2001 | Dyke et al. | 173/170 |
| 6,588,110 | B2 * | 7/2003 | Galster et al. | 30/382 |
| D575,605 | S * | 8/2008 | Yamamoto et al. | D8/65 |
| D576,005 | S * | 9/2008 | Shimokawa et al. | D8/65 |
| 7,540,112 | B1 * | 6/2009 | Crenshaw | 43/137 |
| D660,120 | S * | 5/2012 | Tajik et al. | D8/65 |
| 2002/0129502 | A1 * | 9/2002 | Durr et al. | 30/381 |
| 2004/0098869 | A1 | 5/2004 | Ashfield | |
| 2011/0265334 | A1 * | 11/2011 | Van Bijsterveldt et al. | 30/382 |
| 2012/0023761 | A1 * | 2/2012 | Martinsson et al. | 30/381 |
| 2012/0031635 | A1 * | 2/2012 | Svennung et al. | 173/20 |

FOREIGN PATENT DOCUMENTS

| | | | |
|---|---|---|---|
| CN | 1553847 | A | 12/2004 |
| DE | 3322372 | A1 | 1/1985 |
| DE | 9421298 | U1 | 8/1995 |
| EP | 0469757 | B1 | 2/1992 |
| EP | 0677361 | A1 | 10/1995 |
| JP | 2007185894 | A | 7/2007 |
| WO | 8200436 | A1 | 2/1982 |

OTHER PUBLICATIONS

International Search Report, International Application No. PCT/SE2008/050871, Feb. 20, 2009, pp. 1-4.

Notice of Opposition for European Application No. 08779448.3 dated Nov. 4, 2013.

Office Action Search Report for Chinese Application 20088130346 dated Nov. 25, 2012.

Supplemental European Search Report for European Application No. 08779448.3 dated Nov. 15, 2013.

* cited by examiner

HANDGUARD FOR CHAINSAW

TECHNICAL FIELD

The present invention relates to a chainsaw having an engine housing including an engine, a guide bar extending forwardly from the engine housing for guiding a saw chain driven by the engine, a front handle, a trigger handle including a throttle trigger for throttling the engine, and a front hand guard including a protective structure, projecting in front of the front handle, pivotably attached to the engine housing by at least one lever for releasing a brake to brake the movement of the saw chain when the front hand guard is pivoted.

The word "toggle" usually is a reference to a kind of mechanism or joint consisting of two arms, which are almost in line with each other, connected with an elbow-like pivot. In a phrase like "toggle switch", it specifically refers to one kind of mechanism that can be used to implement a positive "snap-action". In the present context, the term "toggle-link mechanism" is used to designate a snap-action mechanism consisting of three links or arms, which are almost in line with one another and biased against one another along said line.

The words "front" and "rear" are used to designate relative locations along a longitudinal axis of a handheld power tool such as a chain saw, for example. In a chain saw, the saw chain guide bar is located at front end of the saw, while the opposite end is the rear end of the saw.

The words "left" and right" are used to designate relative locations in relation to the longitudinal axis as if a user holds the chain saw.

BACKGROUND

Due to safety regulations chainsaws are equipped with a brake arrangement for stopping the movement of the chain if a kick back occurs. A front hand guard releases the kick back brake when pivoted. This may occur when the user's forehand hits the hand guard or due to the inertia of the hand guard from a rapid kickback. U.S. Pat. No. 5,984,054 shows an example of a chainsaw having a hand guard activated kick back brake.

Another example is shown in U.S. Pat. No. 5,233,750. Chainsaws such as the one disclosed in U.S. Pat. No. 5,233,750 are referred to as top handle saws. A top handle chainsaw is mainly used in trees in combination with a climbing harness or in a skylift. The saw is then used in different positions for example pruning branches. To prevent unnecessary damage to the tree it is desirable to have a good sight on the cutting equipment in all positions. A hand guard may disturb the view presented to the user of the area in which the chainsaw is to be used.

Sometimes the chainsaw is tied to a rope to hoist the saw to the desired location. In such situations a problem that may occur is that objects such as twigs or branches may get stuck in the hand guard and thereby cause damage to the tree or hindering the hoisting process. Twigs may also get stuck in other situations when operating the chainsaw. This is undesirable.

There is therefore a need for arranging a motor driven chainsaw with a hand guard that does not unduly hinder the user from viewing the work area while also reducing the risk of the saw getting stuck or unnecessary damage the tree when in use or during hoisting.

SUMMARY OF THE INVENTION

An object of the invention is to provide a chainsaw with a hand guard which at least minimizes one of the problems stated above, while considering present and expected safety regulations.

In a chain saw of the kind referred to in the introductory portion above, this object is achieved by providing a protective structure that includes:

- see through means enabling at least partial visibility through the protective structure, and
- twig preventing means for limiting the risk of objects such as twigs to get stuck in the protective structure. Thereby an arborist can more easily handle the chainsaw when e.g. climbing trees and cutting branches.

A front hand guard with such a protective structure is particularly suitable for top handle saws, i.e. where the trigger handle (6) is located on top of the housing.

Preferably the see through means is provided by having at least one opening in the protective structure enabling at least partial visibility through the protective structure.

Preferably the at least one opening is at least five openings, preferably more than 10 openings, more preferably more than 20 openings. Thereby visibility through the protective structure is improved.

Preferably the openings forms at least 30%, preferably at least 50% of the protective structure's forward facing area.

The shapes of the openings can be of any shapes, for instance circular or polygonal, preferably hexagonal shapes.

Preferably the twig preventing means is provided is provided by having the protective structure void of any openings larger than 4 cm2, preferably void of any openings larger than 2 cm2, more preferably void of any openings larger than 1 cm2, even more preferably void of any openings larger than 0.5 cm2. The smaller the openings are the less the risk is for a twig or similar object to get stuck in the protective structure.

Alternatively at least one of the at least one opening has a opening area larger than 4 cm2, and where the twig preventing means is provided by covering at least the largest opening in the protective structure, and where the see through means are provided by having a transparent material as the covering material, preferably at least openings larger than 4 cm2 are covered by a transparent material. Preferably the numbers of the at least one opening are less than five.

Alternatively the see through means is provided by having the protective structure made in a transparent material, where preferably the protective structure is void of any openings.

Preferably the protective structure is pivotably attached to the engine housing by two spaced apart levers, preferably to the crankcase of the engine. Thereby any side covers of the engine housing, e.g. the clutch cover, can be easily removed without dismantling the hand guard.

Preferably the guide bar extends from the right hand side of the engine housing and the protective structure is located to the left of the guide bar enabling an operator free vision of the guide bar, preferably to the left of the trigger handle. Thereby the vision of the guide bar is improved for the user.

Preferably at least one of the levers includes a stop member adapted to cooperate with a corresponding stop surface at the engine housing to set a limit for the pivotal movement of hand guard. Thereby the brake mechanism is subjected to less wear when the kick back brake is engaged by pivoting the hand guard.

BRIEF DESCRIPTION OF THE DRAWINGS

In the following, the invention will be described in more detail with reference to preferred embodiments and the appended drawings.

DETAILED DESCRIPTION OF THE INVENTION

Figure 1:
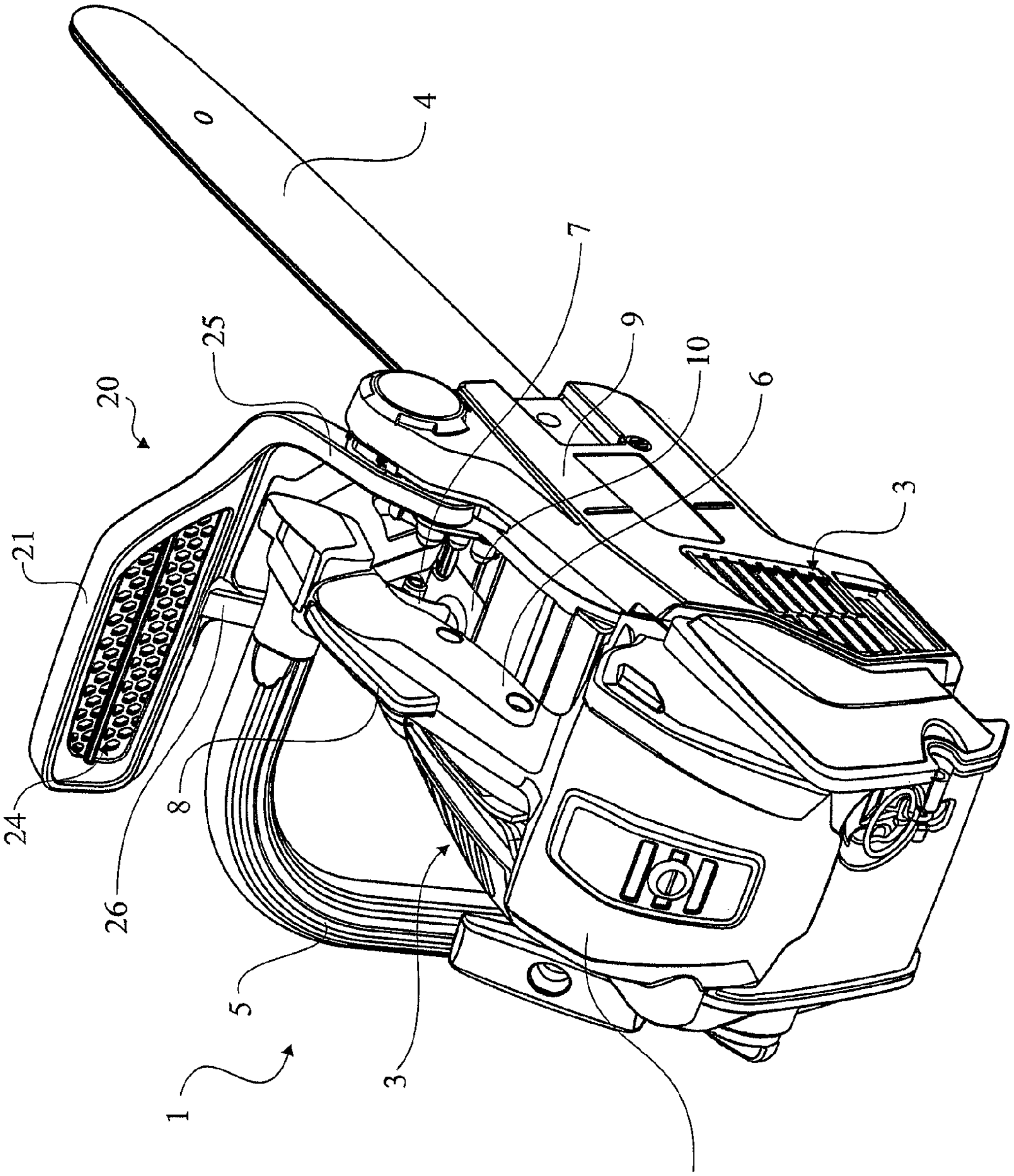
FIG. 1 is a perspective view of a chain saw having a hand guard according to a preferred embodiment.

FIG. 1 is a perspective view of a chain saw 1. The chain saw 1 has an engine housing 2 with an engine 3, a saw chain guide bar 4 extending forwardly from the engine housing 2 for guiding a saw chain (not shown) driven by the engine, a front handle 5 intended for the left hand of the operator, a trigger handle 6 for operating the saw, and a front hand guard 20 including a protective structure 21, projecting in front of the front handle 5, being pivotably attached to the engine housing 2 by at least one lever 25, 26. The front hand guard 20 when being pivoted, activates a brake located inside of a clutch cover 9, which rapidly stops the rotation of the saw chain. More specifically the two levers 25, 26 are pivotably attached to the crank case 10 of the engine 3 which defines a forward portion of the engine housing 2.

Figure 2:
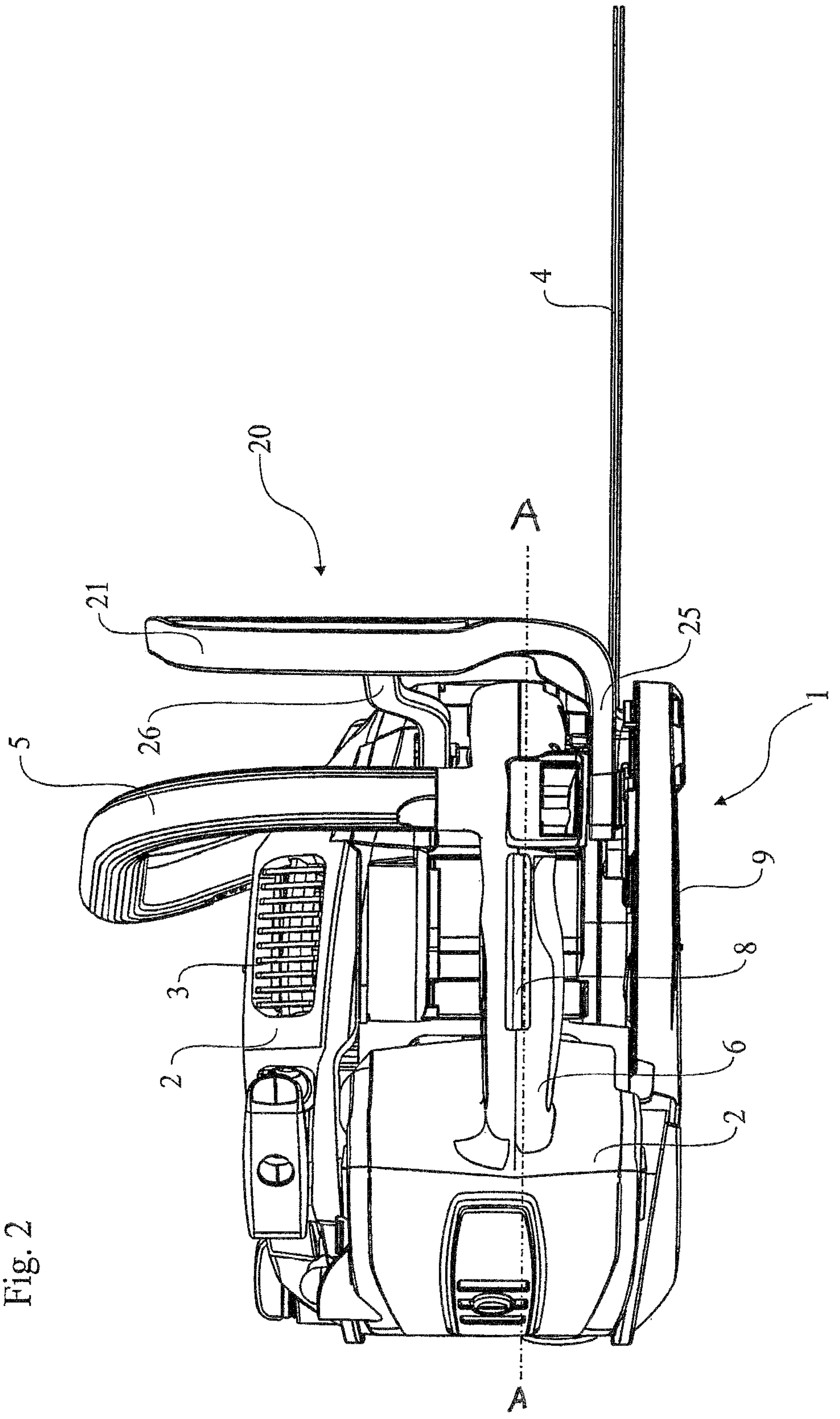
FIG. 2 is top planar view of the chain saw of FIG. 1.

The trigger handle 6 includes a throttle trigger 7 and a throttle trigger lock 8 and is attached to the upper part of the engine housing. The throttle trigger lock 8 has to be pressed down to permit the throttle trigger 7 to move, thereby preventing an inadvertent throttling of the engine 3. The top handle 6 extends in the forward direction and is approximately located in the middle above the chainsaw 1 as best seen in FIG. 2. Chainsaws having the trigger handle 6 at upper part of the engine housing 2 are commonly referred to as top handle saws.

Behind the clutch cover 9 there is a brake drum (not shown) rotatably mounted on the engine housing. The outside of the drum is used for braking, while the inside is affected by the engine's centrifugal clutch (not shown) and the drum is operatively connected to a sprocket (not shown) for driving the saw chain.

The protective structure 21 includes see through means 24 in the form of a pattern of openings 35 (see e.g. FIG. 4), enabling at least partial vision through the protective structure 21.

In FIG. 2 the chainsaw 1 is shown from above. The protective structure 21 of the front hand guard 20 is located in front of the front handle 5 so that if the user's forehand slips due to a kick back it will likely hit the protective structure 21 thereby releasing the kick back brake. To increase vision the front protective structure 21 is located well to the left of the guide bar 4, more specifically just left of the line A-A through the centre of the trigger handle 6 as can be seen in FIG. 2.

Figure 3:
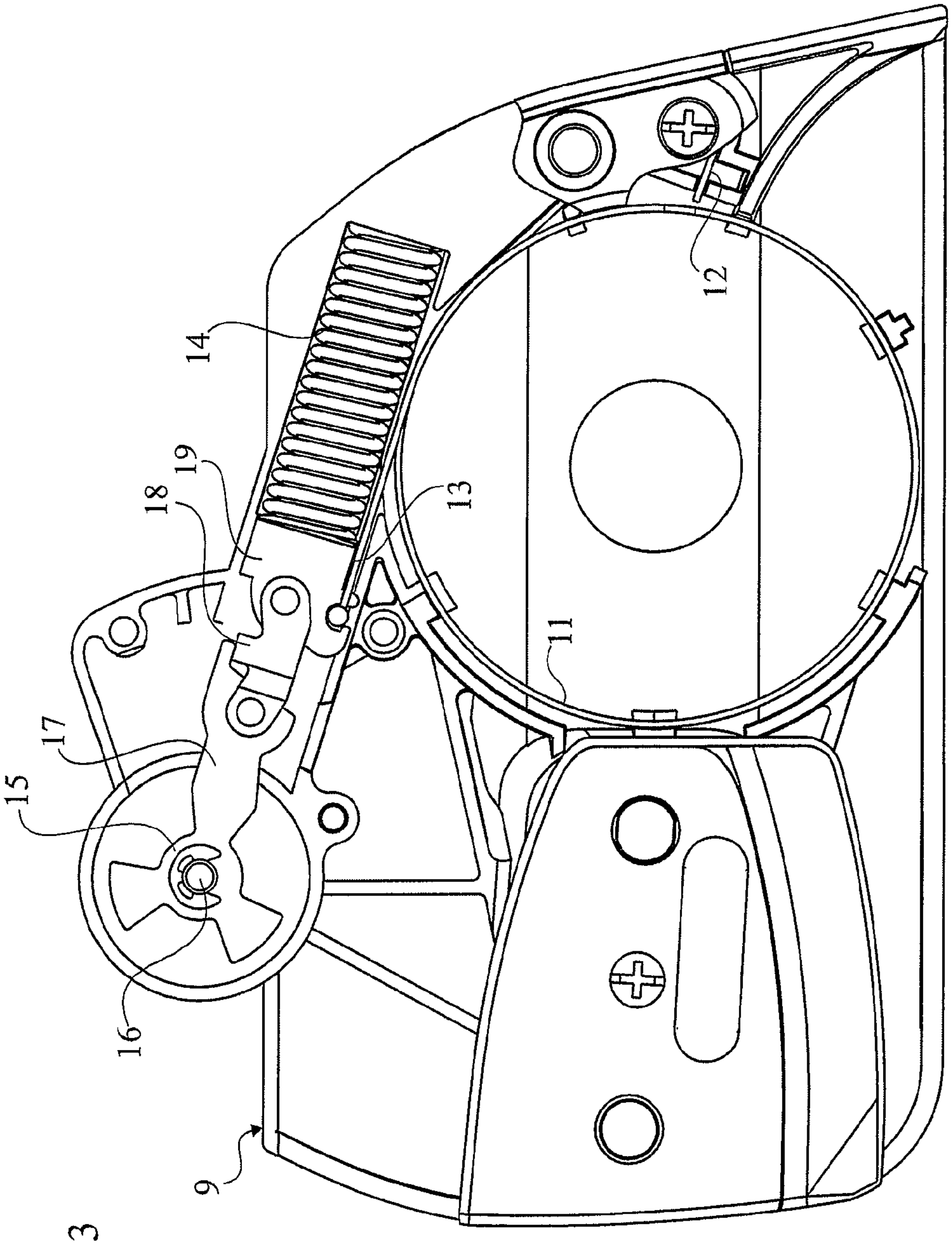
FIG. 3 is an example of a kickback brake arrangement.

FIG. 3 is an example of a kickback brake arrangement. The brake arrangement comprises a kickback brake mainly housed in the clutch cover 9 and including a brake band 11 extending around the brake drum and having a movable first end 13 and a fixed second end 12, and a kickback spring 14 for rapidly exerting a pulling action on the movable first end 13 to rapidly tighten the brake band 11 around the drum in case of a kickback action of the handheld power tool, and a hand guard coupling 15 connected to the hand guard 20 for activating said brake. The fixed second end 12 is in FIG. 3 attached to the clutch cover 9. Via coupling 15, the hand guard 20 is pivotally attached to the engine housing 2 and is operatively connected to a pivotal front link 17 of a toggle-link mechanism 17-19 housed in the clutch cover 9. The front link and the hand guard 20 have a common pivot 16. The toggle-link mechanism further includes a non-pivotal rear link 19 attached to the movable first end 13 of the brake band 11, and an intermediate link 18 pivotally attached to the front link 17 and the rear link 19. The kickback spring 14 biases the rear link 19 towards the pivot 16. During normal operating conditions, the toggle-link mechanism 17-19 has an interlocked normal position, i.e. a position where the links forms a substantially straight line as in FIG. 3. By pivoting the hand guard the mechanism can be snapped into a second position forming a zigzag line, biasing the front link 17 in anticlockwise direction.

Figure 4:
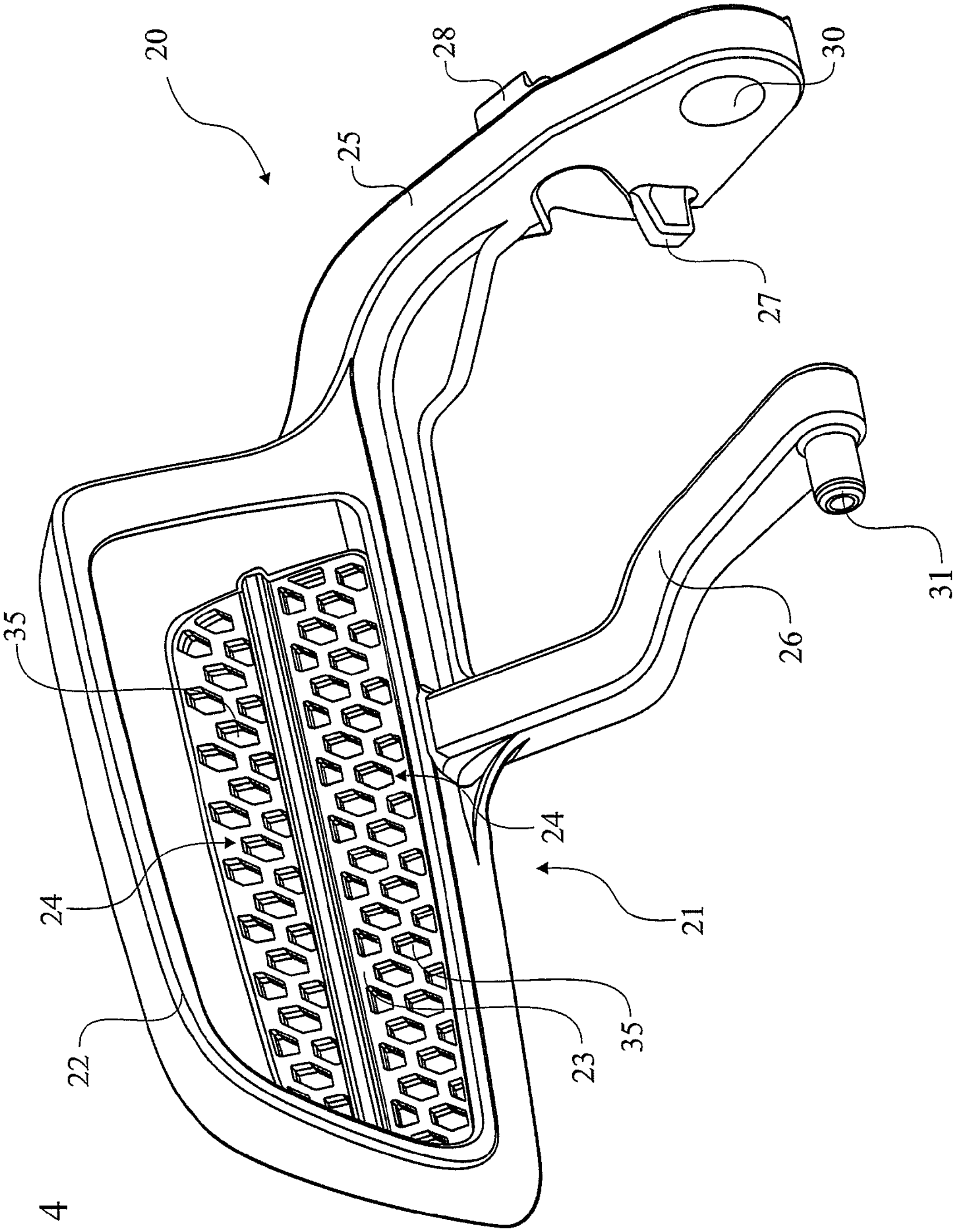
FIG. 4 is a perspective view of the hand guard of FIG. 1.

FIG. 4 shows a perspective view of the front hand guard 20. The front hand guard 20 includes a protective structure 21 having two levers 25, 26 secured to it. The protective structure 21 comprises an outer frame 22 circumcising an inner surface 23 having a plurality of openings 35; the openings 35 being of hexagonal shape. The pattern of openings 35 of the inner surface 23 is labeled as see through means 24, since they enable at least a partial vision through protective structure 2. The area of the openings should be small enough to prevent objects such as branches, twigs, or sticks to get stuck in the protective structure 21, but provide a total opening area large enough to enable at least partial vision through the protective structure 21. Therefore it is preferred that the openings 35 forms at least 30%, more preferably at least 50% of the protective structure's 21 forward facing area.

The first 25 of the two levers 25, 26 has circular hole 30 at its lower end to interact with a corresponding sprint (not shown) at the engine crank case 10 for pivotly joining the first lever 25 to it, and is at its upper end secured to the right lower end of the front protective structure 21. The first lever further includes a clutch coupling 28 for interacting with a hand guard coupling 15 such as e.g. shown in FIG. 3 for activating the kickback brake, and a first stop member 27. The second 26 of the two levers 25, 26 is at its upper end secured to the front protective structure 21 and has protruding sprint 31 at its lower end for pivotly joining it to the engine crank case 10.

Figure 5:
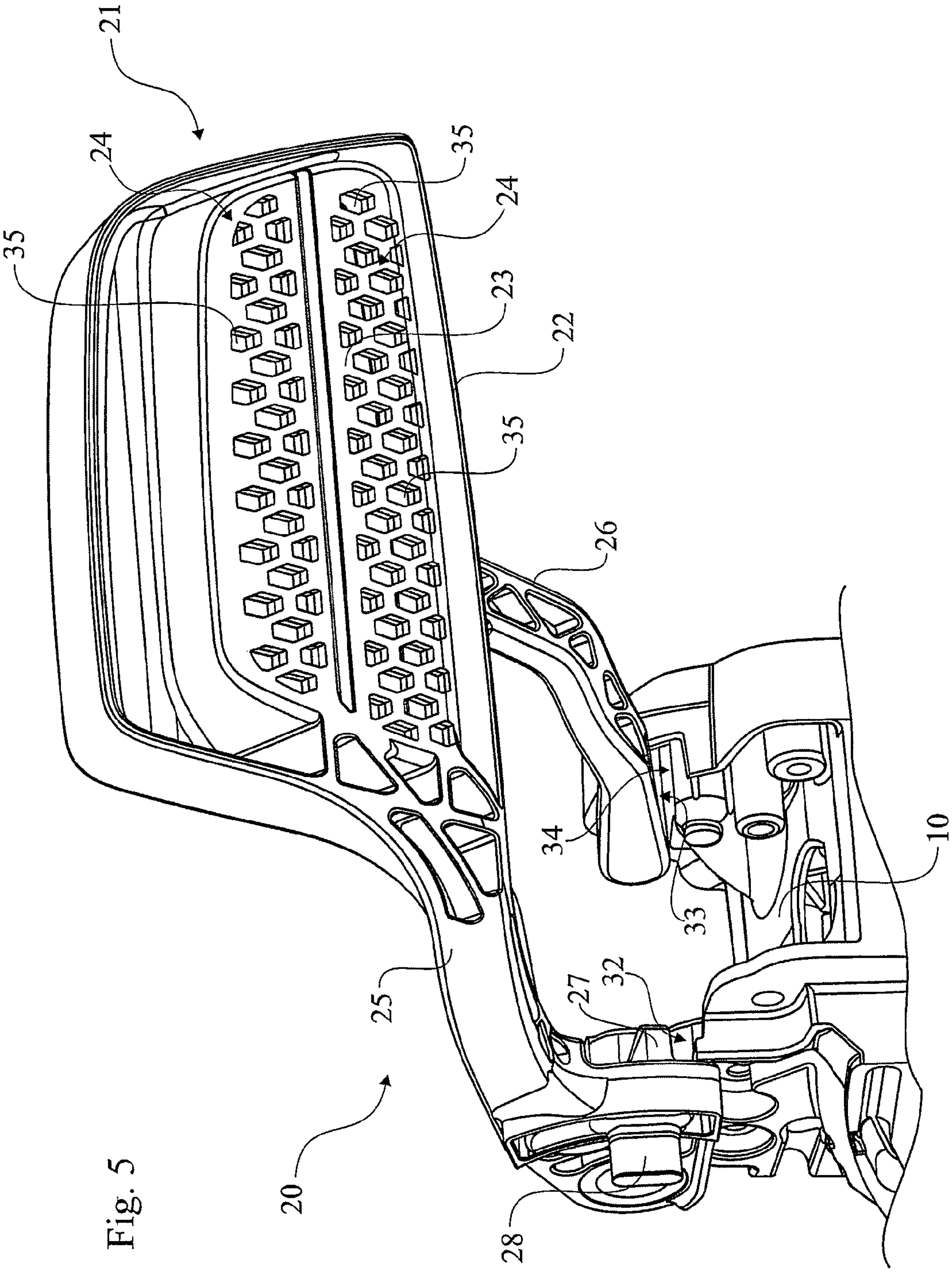
FIG. 5 is a zoomed view of a hand guard mounted to the engine crankcase of FIG. 1.

As seen in FIG. 5, the first stop member 27 is adapted to cooperate with a first stop surface 32 of the engine crankcase 4, to limit the pivotal displacement when actuating the kick back brake. Also the second lever 26 has a stop member in form of a second stop surface 33 at its lower end. The second stop surface 33 cooperates with a corresponding third stop surface 34 of the engine crank case 10, to limit the pivotal displacement when actuating the kick back brake. The pivotal movement of the hand guard 20 could have been limited through the kick back brake arrangement, however by limiting the pivotal movement at the levers 25, 26 through the cooperating stops 27, 32, 33, 34, the brake arrangement is subjected to less stress when frequently used.

Figure 6A:
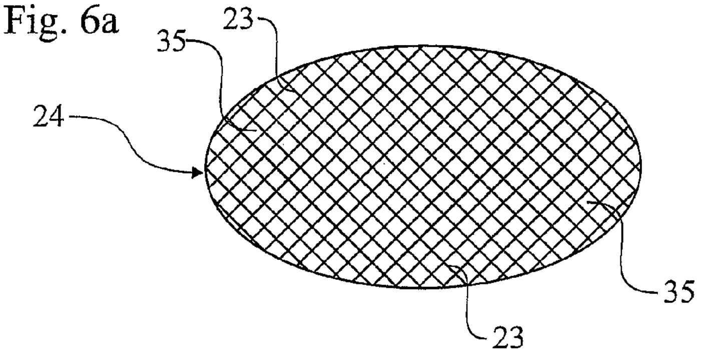
FIG. 6*a*-6*d* shows examples of the inner surface of a hand guard.
Figure 6B:
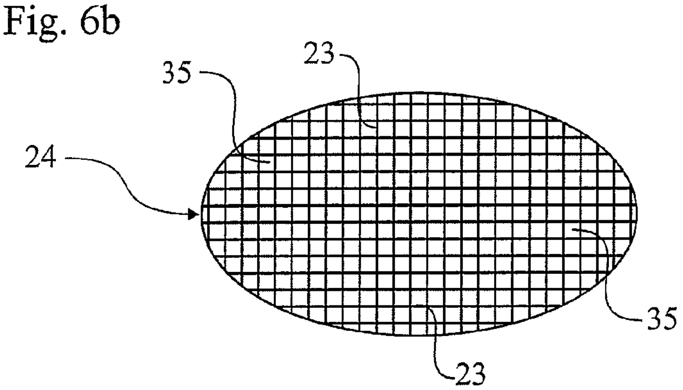
Figure 6C:
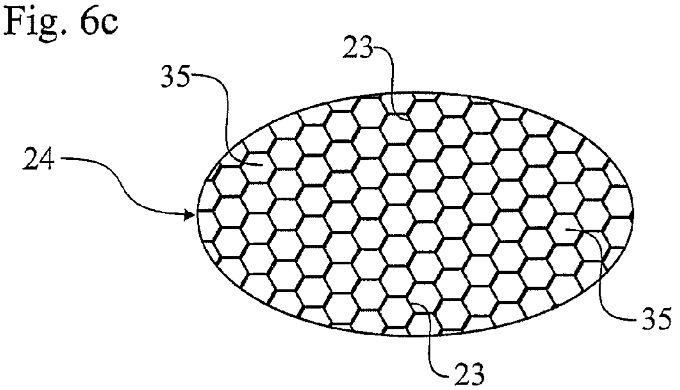
Figure 6D:
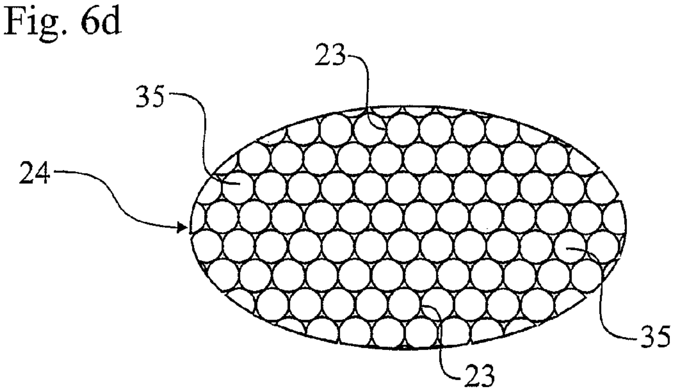

FIG. 6*a*-6*d* shows a number of examples of the pattern of openings 35 providing the see through means 24. In FIG. 6*a*, the see through means 24 is provided by a fine mesh with rhombus shaped openings 35. In FIG. 6*b*, the see through means 24 is provided by a fine mesh with squared shaped openings 35. In FIG. 6*c*, the see through means 24 is provided by a fine mesh in a honey comb pattern. In FIG. 6*d*, shows the see through means 24 is provided by a mesh with a plurality of circular openings 35. Of course, it would be possible that the see through means 24 is a mix of different shapes and sizes of the openings 35.

According to a further embodiment the entire protective structure 21 is made in a transparent material, preferably a transparent polymer. Thus the inner surface 23 and the frame 22 are of the same material, where preferably the inner surface 23 is without any openings. Such an embodiment efficiently prevents objects such as twigs to get stuck in the hand guard while enabling vision through the hand guard. A disadvantage with such a solution is that transparent polymers that are strong enough are comparably expensive.

According to a further embodiment the protective structure 21 is a frame structure with comparably large openings, i.e. openings that would allow twigs to get stuck in the protective structure 21. However, these large openings are covered by a transparent material, preferably a polymer, i.e. as a window with a reinforcing frame. The advantage with such a solution is that the frame could be made in a strong less expensive non transparent material, while the transparent material does not need to be as strong since its purpose is only to prevent twigs to get stuck in the frame while enabling clear vision through the protective structure. Also one big opening is feasible covered by a transparent material on one side or on two sides. The latter creating a both flat and strong box structure 21.

Whereas the invention has been shown and described in connection with the preferred embodiments thereof it will be understood that many modifications, substitutions, and additions may be made which are within the intended broad scope of the following claims. From the foregoing, it can be seen that the present invention accomplishes at least one of the stated objectives.

Preferably, the protective structure's height is shorter than its width to securely protect the front handle 5 while minimizing the visual disturbance of it by keeping it low, i.e. it has as an oblong shape.

Preferably the front hand guard 20 is made in a reinforced polymeric material. Preferably casted as a single unit for instance by injection moulding.

Further, the protective structure 21 could be without the outer frame 22 or to have it only partly circumcise the inner surface 23, for instance only at the top and side portions of it. Also the protective structure 21 may include inner frames to strengthen the inner surface 23.

The invention claimed is:

1. A chainsaw having:

an engine housing including an engine, a guide bar extending forwardly from the engine housing for guiding a saw chain driven by the engine, a front handle, a trigger handle including a throttle trigger for throttling the engine wherein the trigger handle is located on top of the housing, and a front hand guard including a protective structure, projecting in front of the front handle, said front hand guard being pivotably attached to the engine housing by two levers, wherein one of the two levers is located on one side of an axis through the center of the trigger handle, and the other of the two levers is located on the other side of the axis through the center of the trigger handle and the protective structure includes a plurality of openings enabling at least partial visibility through the protective structure, wherein in that the front hand guard is arranged to actuate a brake to brake the movement of the saw chain when the front hand guard is pivoted and wherein the plurality of openings are more than 20 openings and are hexagonal shaped, and wherein the protective structure is located only on one of the sides of the axis through the center of the trigger handle.

2. A chainsaw according to claim 1 wherein the openings form at least 50% of the protective structure's forward facing area.

3. A chainsaw according to claim 1 each opening of the protective structure has an area less than 1 $cm^2$.

4. A chainsaw according to claim 1 wherein the protective structure is pivotably attached to the engine housing by the two levers.

5. A chainsaw according to claim 1 wherein the guide bar extends from the right hand side of the engine housing, and the protective structure is located to the left of the guide bar enabling an operator free vision of the guide bar.

6. A chainsaw according to claim 1 wherein at least one of the two levers includes a stop member adapted to cooperate with a corresponding stop surface at the engine housing to set a limit for the pivotal movement of the hand guard.

7. A chainsaw according to claim 1 wherein the front hand guard is made of a polymeric material and is molded as one single unit.

8. A chainsaw according to claim 1 wherein the protective structure is pivotably attached to a crank case of the engine housing by the two levers.

9. A chainsaw according to claim 1 wherein the see through portion does not extend towards the axis through the center of the trigger handle past where the front handle is joined to the trigger handle.

10. A chainsaw having:

an engine housing including an engine, a guide bar extending forwardly from the engine housing and from the right hand side of the engine housing for guiding a saw chain driven by the engine, a front handle, a trigger handle including a throttle trigger for throttling the engine, and a front hand guard including a protective structure, which includes a see through portion, projecting in front of the front handle, said front hand guard being pivotably attached to the engine housing by two levers, wherein one of the two levers is located on one side of an axis through the center of the trigger handle, and the other of the two levers is located on the other side of the axis through the center of the trigger handle, wherein the front hand guard is arranged to actuate a brake to brake the movement of the saw chain when the front hand guard is pivoted, and the see through portion is located only to one of the sides of the axis through the center of the trigger handle, and thereby enabling an operator free vision of the guide bar.

11. A chainsaw according to claim 10 wherein the protective structure includes a plurality of openings enabling at least partial visibility through said protective structure.

12. A chainsaw according to claim 10, wherein the see through portion comprises a plurality of openings and the number of the plurality of openings is greater than 20.

13. A chainsaw according to claim 12, wherein the plurality of openings are hexagonal.

14. A chainsaw according to claim 12, wherein the plurality of openings are circular.

15. A chainsaw according to claim 10, wherein the see through portion comprises a frame structure and a transparent polymer coupled to the frame structure, wherein the frame structure has a strength that is greater than the transparent polymer.

16. A protective structure configured to be coupled to a chainsaw, the protective structure comprising:

two levers, a first lever and a second lever, configured to be coupled to the chainsaw at a respective proximal end;

a see through portion coupling the first lever to the second lever at a respective distal end, wherein the see through portion extends in a direction transverse to the two levers, and the see through portion extends beyond one of the two levers in the transverse direction but not beyond a mid-line extending longitudinally between the two levers, wherein the see through portion is configured to be to one side of an axis through a throttle trigger handle of the chainsaw when the protective structure is adapted to be coupled to the chainsaw.

17. A protective structure according to claim 16 wherein the see through portion comprises a plurality of openings and the number of the plurality of openings is greater than 20.

18. A protective structure according to claim 17 wherein the plurality of openings are hexagonal.

19. A protective structure according to claim 16 wherein the see through portion comprises a frame structure and a transparent polymer coupled to the frame structure, wherein the frame structure has a strength that is greater than the transparent polymer.

20. A chainsaw comprising:

a housing;

a guide bar extending forwardly from the housing for guiding a saw chain;

a front handle;

a trigger handle including a trigger, wherein the trigger handle is located on top of the housing;

a front hand guard including a protective structure, projecting in front of the front handle, the front hand guard being pivotably attached to the housing by two spaced part levers;

one of the two spaced apart levers is located on one side of an axis through the center of the trigger handle and the other of the two spaced apart levers is located on the other side of the axis;

the protective structure includes a see through portion in which a plurality of openings are formed and the see through portion is located only on one side of the axis; and the front hand guard is coupled to a brake to brake the movement of the saw chain when the front hand guard is pivoted.

* * * * *